Oct. 25, 1966    KO-HSIN LIU    3,281,676

METHOD FOR TESTING THE RESPONSE OF HIGH IMPEDANCE CIRCUITRY

Filed Sept. 6, 1962

Inventor
Ko-Hsin Liu
by G. Henry Peterson
Agent

United States Patent Office 3,281,676
Patented Oct. 25, 1966

3,281,676
METHOD FOR TESTING THE RESPONSE OF HIGH IMPEDANCE CIRCUITRY
Ko-Hsin Liu, Hilliard, Ohio, assignor to Industrial Nucleonics Corporation, a corporation of Ohio
Filed Sept. 6, 1962, Ser. No. 221,846
10 Claims. (Cl. 324—57)

The present invention relates generally to electronic amplifiers and more particularly to a novel method and means for determining the transient and steady-state response of electrometer feedback amplifiers.

Electrometer amplifiers have been employed for a number of years in apparatus for various scientific and industrial measurement applications. In these applications the electrometer amplifier is ordinarily associated with a transducer such as an ionization chamber having a current output in the order of $10^{-7}$ to $10^{-13}$ amperes. Hence in order to obtain an adequate voltage signal for amplification by the electrometer system, it is necessary to employ a transducer load resistor of extremely high ohmage in the electrometer input circuit. The input circuit also unavoidably contains inherent stray capacitance. While by good design this capacitance can be reduced to the order of a few micromicrofarads, even this amount of capacitance in parallel with the high ohmage resistor usually gives a time constant of several seconds, which has resulted in very slow response from electrometer measuring systems. For many years this was not considered too serious a limitation since the performance of the system was adequate for most practical uses.

Recently, however, more sophisticated electrometer systems are required for radiation measurements in space vehicles and for industrial gauging applications where the measuring device must provide the basic information for the automatic computation of short-term process variance. As is now well known, the problem of upgrading the speed of response is solved by the proper use of negative feedback.

However, the expeditious design and production of the new electrometer systems has been severely hampered by the lack of a suitable response-testing method. While the response-testing procedure basically requires a simple comparison of input and output signals, the electrometer amplifier presents a special problem because of its extremely high input impedance characteristic. This prohibits any attempt to measure the amplifier input signal directly, since the introduction of any measuring device loads the input circuit to such an extent that the amplifier's characteristics are drastically altered and the observed results are meaningless.

It has been proposed in U.S. Patent No. 3,049,621 to employ a radiation transducer associated with a mechanical radiation modulator to provide response measurements. This system appears to be usable only at very low frequencies, and it is restricted to a single waveform which is difficult obtain with an adequate degree of purity.

As described in an article by J. Praglin and W. A. Nichols in the Proceedings of the IRE, vol. 48, No. 4, April 1960, page 777, it has also been proposed to test electrometer systems response by an all-electronic method. This method comprises applying to the electrometer input an electric current step-function derived from a triangular wave voltage generator coupled to the input through a resistance-capacitance network of such a short time constant that a current square wave is simulated. However, this method requires a special wave generator; it is difficult to compare the triangular voltage waveform with the electrometer output voltage waveform, which should approximate a square wave, and the method is usable only for determining the step-function transient response.

In accordance with this invention it is noted that the electrometer measuring device has an inherent stray input capacitance, which may comprise, for example, the interelectrode capacitance of an ionization chamber and its interconnecting coaxial transmission line. This input capacitance, having a certain value, normally appears in shunt relation to the input terminal and the ground or other reference terminal of the electrometer amplifier. According to the method of the invention, this input capacitance value is removed from the shunting relationship aforesaid and connected in series with the test voltage waveform generator and said input terminal. This procedure will obviously alter the original transfer function of the electrometer system. However, further in accordance with the invention, the original transfer function is readily restored by connecting an operational integrator in series with the output circuit of the electrometer system. Direct comparison can now be made between the output of the voltage waveform generator and the output of the operational integrator, using, for example, a two-channel cathode-ray oscilloscope.

Accordingly it is a primary object of the present invention to provide an improved all-electronic method and means for analyzing the response of an electrometer system.

It is also an object of the present invention to provide such a method which does not require complicated wave generating equipment for excitation of the system to be analyzed.

It is another object to provide an electrometer response analyzing method which allows direct comparison between two readily measurable voltage waveforms.

It is still another object to provide such a method which admits of the use of any input waveform.

It is a further object to provide a method and means for effecting both transient and frequency response analysis of electrometers in a simple, reliable and accurate manner.

These and other objects of the present invention will become more apparent from the following description when taken in conjunction with the appended drawing, in which.

Figure 1:
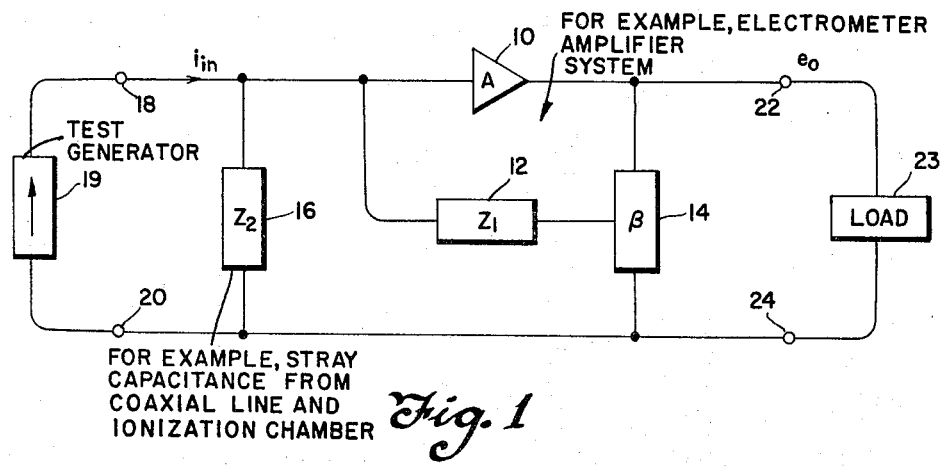
FIG. 1 is a simplified circuit diagram of a typical electrometer system.

With reference now to the drawings, FIG. 1 shows in general form a conventional electrometer system including an amplifier 10 useful in measuring a minute signal current $i_n$ such as that generated by a radiation transducer 19, for example, an ionization chamber.

Elements 12 and 14 provide negative feedback around the amplifier 10 and may include the bucking voltage circuits commonly used in null balance measuring systems. The current source 19 is shunted by an impedance 16 which may represent, for example, the shunt capacitance of an ionization chamber type radiation detector circuit. The value of capacitance exhibited by the source is equivalent to the sum of the interelectrode capacitance of the chamber used and the capacitance of any coaxial transmission line normally connecting the source 19 to the electrometer circuit.

Input terminals 18, 20 are provided for connection to the driving source 19 and output terminals 22, 24 are connected to a load 23 which may comprise additional amplifier or controller circuitry.

In response to the driving current $i_{in}$, the circuit provides an output potential $e_0$ across the load 23. Denoting impedance values by the legend scheme shown in FIG. 1, the system transfer function can be expressed in terms of Laplace transform-operator notation as follows:

$$KG = \frac{e_0(s)}{i_{in}(s)} = \frac{\frac{Z_1 Z_2}{Z_1 + Z_2} A}{1 - A\beta \frac{Z_2}{Z_1 + Z_2}} \quad (1)$$

where A is the forward sequence transfer function of the amplifier 10, $Z_1$ and $Z_2$ refer to the impedance values of elements 12 and 16 respectively, and $\beta$ is the attenuation factor of the feedback loop.

Figure 2:
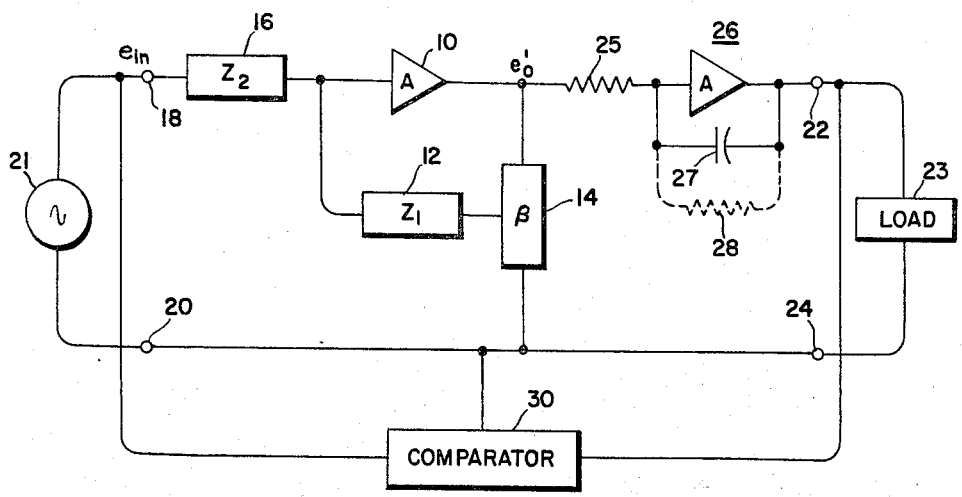
FIG. 2 is a schematic diagram illustrating an arrangement for analyzing the system of FIG. 1 in accordance with the present invention.

In accordance with the present invention the circuit is modified and driven by any available voltage source. Referring to FIG. 2, the shunting impedance $Z_2$ is removed and reinserted in series with a voltage source 21 providing a potential $e_{in}$. In response to $e_{in}$ the circuit provides an output $e_0'$ from which the transfer gain function $$K_1 G_1 = \frac{e_0'(s)}{e_{in}(s)} = \frac{\frac{Z_1}{Z_1 + Z_2} A}{1 - A\beta \frac{Z_2}{Z_1 + Z_2}} \quad (2)$$

is readily obtained. The new transfer function is seen to differ from the original by the absence of a $Z_2$ factor in the numerator. It is noted that $$Z_2 = \frac{1}{sC_2}$$

where $C_2$ is the aforesaid total input shunting capacitance. See for example Analog and Digital Computer Technology by N. R. Scott, McGraw-Hill, 1960, table 2.1, page 39. Since multiplication by $1/s$, that is, division by the complex variable $s$ corresponds to integration in real time, it is necessary to integrate the modified output potential $e_0'$ with respect to time to provide an overall transfer function identical to Equation 1. See for example Gardner and Barnes, Transients in Linear Systems, John Wiley & Sons, 1942, page 271, Theorem 7–a.

Accordingly, an operational amplifier 26 having an input resistance 25 and a feedback capacitance 27 is connected between the output of the main amplifier 10 and the load output terminals 22, 24. This circuit and its appropriate transfer function are explained by Scott, cited above, see pages 8–10. In order to operate the integrator for a periodic applied test voltage waveform $e_{in}$ without saturation of the amplifier, a resistor 28 may be connected in parallel with the capacitance 27. The time constant of the resistor-capacitor combination need only be much longer than the period of the test waveform used at 21.

In the practice of the present invention, it is usually convenient to measure the capacitance of the chamber and transmission line by conventional auxiliary methods. An equivalent capacitance is then substituted as $Z_2$, FIG. 2, in series with the test generator 21. Alternatively, the chamber and transmission line elements may be themselves physically connected in series with the input signal $e_{in}$. Hereinafter, the term "equivalent capacitor" is used to designate either of these alternatives. To perform the analysis, a comparator 30 is used to compare the input and the output waveforms. This unit may, in a typical example, comprise a two-channel oscilloscope for receiving the input and output waveforms and displaying the same in a time coincidence pattern. This procedure would be followed in a transient response analysis wherein the input test signal would be a square waveform. Analysis of the output waveform by conventional methods yields data concerning the natural frequency and damping factor of the circuit. By exciting the input with a sinusoidal waveform of adjustable frequency it is possible to compare the ratio of the magnitudes of the output to the input voltage at various frequencies and plot a gain and phase frequency response. In this case the comparator unit may comprises a ratio computer operating in conjunction with a sweep generator and curve plotter or simply an operator capable of manually performing the mathematical analysis required and of graphically displaying the information in a conventional manner.

Although only certain procedures and specific embodiments have been shown and described herein, many changes and modifications may be made without departing from the true spirit and scope of the invention as set forth in the appended claims.

I claim:

1. The method of determining the response, to a test signal produced by a generator thereof, of an electrical network having input terminals, output terminals providing an output signal in response to a signal applied to said input terminals, and a circuit having a stray capacitance normally shunting said input terminals, said method comprising the steps of removing said stray capacitance circuit from said shunting relation, connecting said test generator and an element having a capacitance equal to said stray capacitance in series across said input terminals, integrating the signal thereupon appearing at said output terminals to obtain an output signal, and comparing said output signal with said test signal.

2. The method of determining the response, to a test signal produced by a generator thereof, of an amplifier having input terminals, output terminals providing an output voltage signal in response to a current signal applied to said input terminals, and a circuit having a stray capacitance normally shunting said input terminals, said method comprising the steps of removing said stray capacitance circuit from said shunting relation, measuring the value of said stray capacitance, selecting a test capacitor having a value substantially equal to said measured value, connecting said test generator and said test capacitor in series with said input terminals, integrating the voltage signal thereupon appearing at said output terminals, and comparing the waveform resulting from said integration with said test signal.

3. The method of determining the response, to a test voltage produced by a generator thereof, of an electrometer system having input terminals, output terminals providing an output voltage signal in response to a current signal applied to said input terminals, and an ionization chamber connected by a coaxial transmission line to said input terminals, said chamber and line providing a total capacitance normally shunting said input terminals, said method comprising the steps of removing said ionization chamber and said transmission line from said shunting relationship with said input terminals, serially connecting said test generator and a capacitor having said total capacitance across said input terminals, integrating the voltage signal thereupon appearing at said output terminals, and comparing the waveform resulting from said integration with the waveform of said input test voltage.

4. The method of determining the response, to a test voltage produced by a generator thereof, of an electrometer system having input terminals, output terminals providing an output voltage signal in response to a current signal applied to said input terminals, and an ionization chamber connected by a coaxial transmission line to said input terminals, said chamber and line providing a combined capacitance normally shunting said input terminals, said method comprising the steps of removing said ionization chamber and said transmission lines from said shunting relationship with said input terminals, measuring said combined capacitance of said chamber and line, selecting a test capacitor having a value substantially equal to said measured value, connecting said test generator in series with said test capacitor across said input terminals, integrating the voltage signal thereupon appearing at said output terminals, and comparing the waveform resulting from said integration with the waveform of said input test voltage.

5. The method of determining the response, to a test voltage produced by a generator thereof, of an electrometer system having input terminals, output terminals providing an output voltage signal in response to a current signal applied to said input terminals, and a circuit having a stray capacitance normally shunting said input terminals, said method comprising the steps of removing said stray capacitance circuit from said shunting relation, connecting said test generator and an element having a capacitance equal to said stray capacitance in series across said input terminals, applying the voltage thereupon appearing at said output terminals to the input circuit of a high-gain amplifier having a feedback capacitor connecting the input and output circuits thereof, and comparing the waveform appearing at said output circuit of said high-gain amplifier with the waveform of said test voltage.

6. The method of determining the response to a test voltage produced by a generator thereof, of an electrometer system having input terminals, output terminals providing an output voltage signal in response to a current signal applied to said input terminals, and an ionization chamber connected by a coaxial transmission line to said input terminals, said chamber and transmission line providing a total capacitance normally shuting said input terminals, said method comprising the steps of:
  removing said ionization chamber and transmission line from said shunting relationship with said input terminals,
  connecting said ionization chamber and said transmission line between said test voltage generator and said input terminals to provide said total capacitance in series with said input terminals,
  coupling an operational integrator network to said output terminals to provide an integrated output voltage, and
  visually comparing the waveform of said integrated output voltage with the waveform of said input test voltage.

7. The method of determining the response to a test signal provided by a generator of an electrical network having input terminals and output terminals and an impedance of a known magnitude and phase angle shunting said input terminals, said method comprising the steps of:
  removing said impedance from said shunting relationship with said input terminals,
  connecting an impedance having a magnitude and phase angle equivalent to that of said shunting impedance in series with said generator across said input terminals to provide a first signal at said output terminals,
  shifting the phase of said first signal by an amount equal to said phase angle of said shunting impedance to provide an output signal, and
  comparing said output signal with said test signal.

8. The method of determining the response to a test signal provided by a generator of an electrical network having input terminals and output terminals and a stray capacitance shunting said input terminals, said method comprising the steps of:
  removing said stray capacitance from said shunting relation,
  connecting an element having a capacitance equal to said stray capacitance in series with said generator across said input terminals to provide a first signal at said output terminals,
  shifting the phase of said first signal by minus 90 degrees to provide an output signal, and
  comparing said output signal with said test signal.

9. The method of determining the response to a test voltage produced by a generator thereof, of an electrometer system having input terminals, output terminals providing an output voltage signal in response to a current signal applied to said input terminals, and an ionization chamber connected by a coaxial transmission line to said input terminals, said chamber and transmission line providing a total capacitance normally shunting said input terminals, said method comprising the steps of:
  removing said ionization chamber and transmission line from said shunting relationship with said input terminals,
  connectng said ionization chamber and said transmission line between said test voltage generator and said input terminals to provide said total capacitance in series with said generator across said input terminals,
  integrating the voltage appearing at said output terminals, and
  comparing the waveform of said integrated output voltage with the waveform of said input test voltage.

10. The method of determining the response to a test voltage produced by a generator thereof, of an electrometer system having input terminals, output terminals providing an output voltage signal in response to a current signal applied to said input terminals, and an ionization chamber connected by a coaxial transmission line to said input termnals, said chamber and transmission line providing a total capacitance normally shunting said input terminals, said method comprising the steps of:
  removing said ionization character and said transmission line from said shunting relationship with said input terminals,
  connecting a test capacitor having a capacitance equal to said total capacitance in series with said test generator across said input terminals,
  coupling an operational integrator to said output terminals to provide an integrated output voltage, and
  comparing the waveform of said integrated output voltage with the waveform of said test voltage.

References Cited by the Examiner

UNITED STATES PATENTS

| | | | |
|---|---|---|---|
| 2,541,198 | 2/1951 | Brenholdt | 324—123 |
| 2,735,064 | 2/1956 | Salzberg | 324—57.3 |
| 2,816,266 | 12/1957 | Nadolski. | |
| 2,965,847 | 12/1960 | Radley | 324—57 X |
| 2,973,476 | 2/1961 | Graham | 324—60 |
| 3,032,710 | 5/1962 | White | 324—57 |
| 3,052,836 | 9/1962 | Postma | 324—57 X |

OTHER REFERENCES

Electrical Engineering, April 1955, p. 285, "Cyclic Integrator Measures Frequency Response."

WALTER L. CARLSON, *Primary Examiner.*

A. E. RICHMOND, *Assistant Examiner.*